US007760678B2

(12) United States Patent
Sandhu et al.

(10) Patent No.: US 7,760,678 B2
(45) Date of Patent: Jul. 20, 2010

(54) COOPERATIVE TRANSMISSION APPARATUS, SYSTEMS, AND METHODS

(75) Inventors: Sumeet Sandhu, Santa Clara, CA (US); Ozgur Oyman, Palo Alto, CA (US); Timothy F. Cox, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 905 days.

(21) Appl. No.: 11/563,386

(22) Filed: Nov. 27, 2006

(65) Prior Publication Data

US 2008/0123574 A1    May 29, 2008

(51) Int. Cl.
  H04B 7/14    (2006.01)
  H04B 3/36    (2006.01)
  H04J 1/10    (2006.01)
  H04J 3/08    (2006.01)
  H04J 3/14    (2006.01)
(52) U.S. Cl. .................... 370/315; 455/7; 370/246
(58) Field of Classification Search .............. 455/7; 370/246, 315
See application file for complete search history.

(56) References Cited

U.S. PATENT DOCUMENTS

| 2002/0150041 | A1* | 10/2002 | Reinshmidt et al. | 370/216 |
| 2006/0270363 | A1* | 11/2006 | Sandhu et al. | 455/101 |
| 2007/0041345 | A1* | 2/2007 | Yarvis et al. | 370/331 |
| 2008/0075007 | A1* | 3/2008 | Mehta et al. | 370/238 |

OTHER PUBLICATIONS

"Abstracts", *MSRI Workshop: Mathematics of Relaying and Cooperation in Communication Networks*, http://www.eecs.berkeley.edu/~gastpar/MSRI/abstracts.html,(Apr. 10-12, 2006).
Bicket, John, et al., "Architecture and evaluation of an unplanned 802.11b mesh network", *Proceedings of the 11th Annual International Conference on Mobile Computing and Networking*, (2005),31-42, Aug. 28, 2005-Sep. 2, 2005.
Mitran, P., et al., "Space-time diversity enhancements using collaborative communications", *IEEE Transactions on Information Theory*, 51(6), (Jun. 2005),2041-2057.
Sendonaris, A., et al., "Increasing uplink capacity via user cooperation diversity", *IEEE International Symposium on Information Theory, 1998. Proceedings.*, (1998),156.

* cited by examiner

*Primary Examiner*—Marivelisse Santiago-Cordero
(74) *Attorney, Agent, or Firm*—Schwegman, Lundberg & Woessner, P.A.

(57) ABSTRACT

Embodiments herein may operate at a cooperating relay station (CRS) in a wireless packet-carrying network (WPCN). A source-to-CRS (SC) link quality of an SC wireless channel may be estimated using signal quality information derived from a packet transmitted by a source station and received by the CRS. A CRS-to-destination (CD) link quality of a CD wireless channel may also be estimated using signal quality information derived from a packet transmitted by a destination station and received by the CRS. A source-to-destination (SD) link quality parameter representing SD link quality may be extracted by the CRS from the packet transmitted by the destination station. The CRS may decide whether to participate with the source station or with another CRS in transmitting an SD packet based upon the SC link quality, the CD link quality, the SD link quality, or a combination thereof. Other embodiments may be described and claimed.

25 Claims, 3 Drawing Sheets

COOPERATIVE TRANSMISSION APPARATUS, SYSTEMS, AND METHODS

TECHNICAL FIELD

Various embodiments described herein relate to apparatus, systems, and methods associated with wireless communication, including cooperative communication techniques.

BACKGROUND INFORMATION

Cooperative communication by independent wireless devices has been proposed as a means of providing spatial diversity and multiplexing gains in a distributed fashion. It has been proposed that users share their antennas and other resources to create a virtual array through distributed transmission and signal processing. Additional information regarding cooperative communication may be found in A. Sendonaris, E. Erkip and B. Aazhang, "Increasing Uplink Capacity Via User Cooperation Diversity," in Proceedings of the Institute of Electrical and Electronic Engineers (IEEE) International Symposium on Information Theory, Cambridge, Mass., Aug. 1998, p. 156.

Reliable range extension techniques may be especially useful for transmitting very long packets from devices located at the edge of a coverage area associated with a wireless, packet-carrying network (WPCN). A single-antenna device such as an IEEE 802.16-capable cellular telephone may benefit from spatial diversity provided by neighboring cellular telephones equipped for cooperative communication, for example. Spatial diversity may increase effective data rates by allowing a packet to be transmitted at a higher modulation and coding scheme (MCS) without a loss of reliability. Additional information regarding the IEEE 802.16e™ protocol standard may be found in 802.16e™: IEEE Standard for Local and Metropolitan Area Networks—Part 16: Air Interface for Fixed and Mobile Broadband Wireless Access Systems—Amendment 2: Physical and Medium Access Control Layers for Combined Fixed and Mobile Operation in Licensed Bands (published Feb. 28, 2006).

Thus, expected transmission times associated with transfers of large data files (e.g., photographs) may be reduced using cooperative communication techniques. However, deciding which stations are to cooperate with a source station to transmit to a destination station may be challenging.

DETAILED DESCRIPTION

Figure 1:
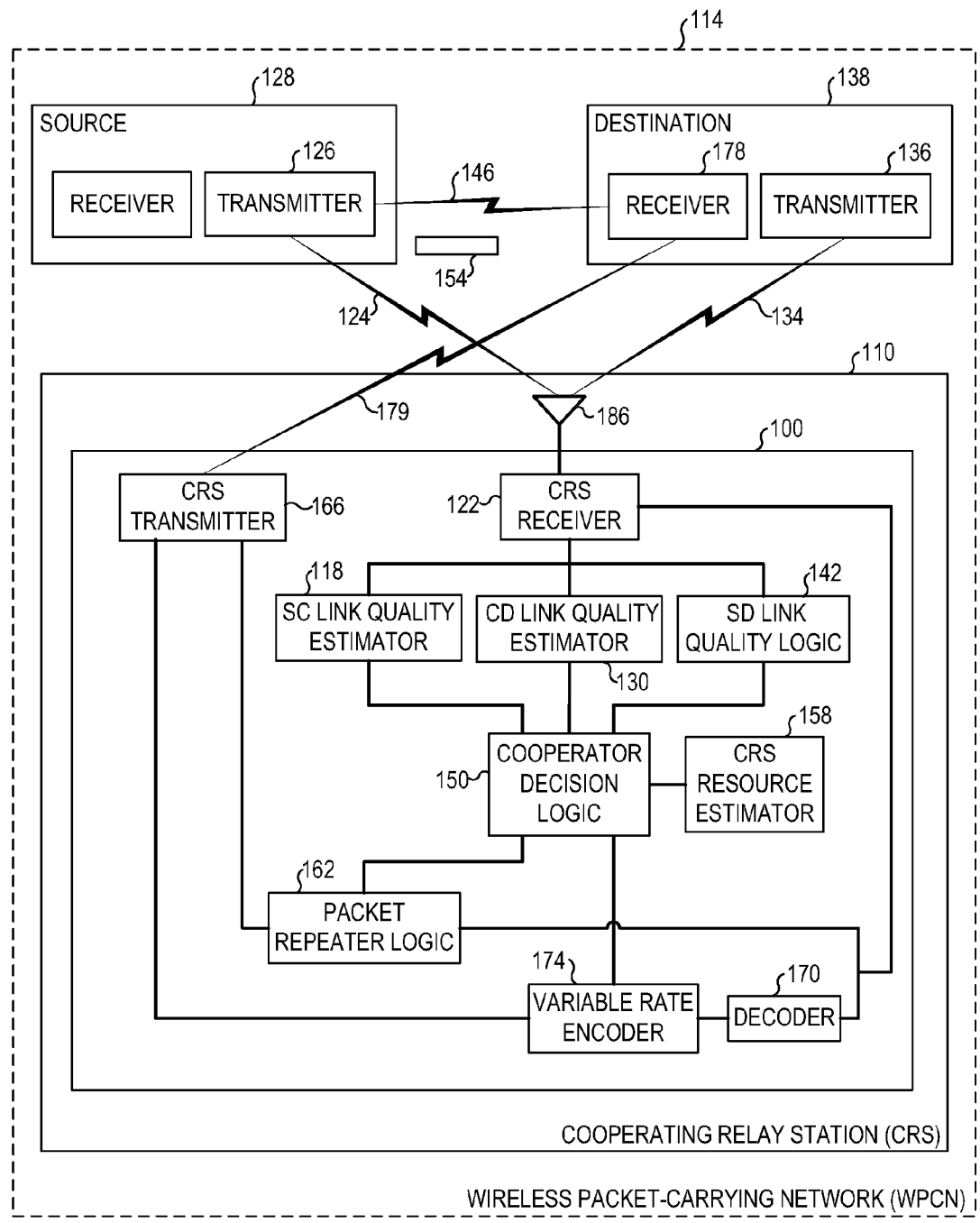
FIG. 1 is a block diagram of an apparatus and a system according to various embodiments.

FIG. 1 comprises a block diagram of an apparatus 100 and a system 180. The apparatus 100 may be associated with a cooperating relay station (CRS) 110 in a WPCN 114. The WPCN 114 may be configured according to an IEEE 802.11 standard or an IEEE 802.16 standard, among others. Additional information regarding the IEEE 802.11 standard may be found in "ANSI/IEEE Std. 802.11, Information technology-Telecommunications and information exchange between systems—Local and metropolitan area networks—Specific requirements—Part 11: Wireless LAN Medium Access Control (MAC) and Physical Layer (PHY) Specifications" (published 1999; reaffirmed June 2003).

The apparatus 100 may include a source-to-CRS (SC) link quality estimator 118 coupled to a CRS receiver 122. The SC link quality estimator 118 may estimate the quality of an SC link 124 associated with an SC wireless channel ("SC link quality"). The SC link quality estimator 118 may use signal quality information derived from a packet transmitted by a transmitter 126 associated with a source station 128 and received at the CRS 110 to estimate the SC link quality. The packet from the source station 128 may comprise a request-to-send (RTS) packet in some embodiments.

A CRS-to-destination (CD) link quality estimator 130 may also be coupled to the CRS receiver 122. The CD link quality estimator 130 may estimate the quality of a CD link 134 associated with a CD wireless channel ("CD link quality"). The CD link quality estimator 130 may use signal quality information derived from a packet transmitted by a transmitter 136 associated with a destination station 138 and received at the CRS 110 to estimate the CD link quality. The packet from the destination station 138 may comprise a clear-to-send (CTS) packet in some embodiments.

The apparatus 100 may also include source-to-destination (SD) link quality logic 142 coupled to the CRS receiver 122. In some wireless systems, the destination station 138 may measure received signal characteristics associated with one or more packets received from the source station 128 on an SD link 146. The destination station 138 may calculate or estimate the quality of the SD link 146 ("SD link quality") from the measured received signal characteristics. The destination station 138 may subsequently embed a value corresponding to the SD link quality in a link quality parameter in the CTS packet. Upon receipt of the CTS packet at the CRS 110 over the CD link 134, the SD link quality logic 142 may extract the link quality parameter from the CTS packet.

Reference is made herein to RTS and CTS packets as sources of channel quality information utilized by embodiments of the invention. It is noted that some WPCNs may utilize channel reservation schemes employing packet types other than RTS and CTS packets for purposes similar to those served by RTS and CTS packets according to IEEE 802.11 protocols. The techniques and inventive subject matter disclosed herein are intended to apply to any such analogs of the IEEE 802.11 RTS and CTS packets that may be utilized in WPCNs other than those operating according to the IEEE 802.11 standard.

The apparatus 100 may further include cooperator decision logic 150 coupled to the SC link quality estimator 118, the CD link quality estimator 130, and the SD link quality logic 142. The cooperator decision logic 150 may choose whether the CRS 110 is to participate with the source station 128 or with another CRS in transmitting an SD packet 154. A choice to participate may be based upon the SC link quality, the CD link quality, the SD link quality, or a combination thereof. Additional decision criteria may be input to the cooperator decision logic 150. For example, a CRS resource estimator 158 may be coupled to the cooperator decision logic 150. The CRS resource estimator 158 may provide an estimate of remaining battery life, a cost of airtime associated with the CRS, or both, among other possible factors relating to a cost of participation by the CRS 110.

In another example, an end-to-end link quality metric may be used by the cooperator decision logic 150. The end-to-end link quality metric may be defined as a function of individual link quality metrics, the latter accounting for physical layer channel conditions over the SC link 124, the CD link 134, and SD link 146. Additional information may be found in the reference by O. Oyman, S. Sandhu, and N. Himayat titled "End-to-end Throughput Metrics for QoS Management in 802.16j MR Systems," contribution IEEE C802.16j-06/202r1 to the Relay Task Group IEEE 802.16j in the IEEE 802.16 Broadband Wireless Access Working Group, text at http://ieee802.org/16.

Additional structures associated with the CRS 110 may enable various modes of cooperation, including multi-hop and mesh modes. The apparatus 100 may include packet repeater logic 162 operatively coupled to the CRS receiver 122 and to a CRS transmitter 166. The packet repeater logic 162 may transmit, or cause to be transmitted, an as-received version of the SD packet 154, or a portion thereof, from the CRS 110.

In another mode, a decoder 170 may be coupled to the CRS receiver 122. The decoder 170 may decode the as-received version of the SD packet 154. A variable-rate encoder 174 coupled to the decoder 170 may subsequently re-encode the decoded as-received version of the SD packet 154. The packet may be re-encoded using a modulation and coding scheme (MCS) different from an MCS of the as-received version of the SD packet 154. A packet thus re-encoded may subsequently be transmitted from the CRS transmitter 166 to a receiver 178 associated with the destination station 138 over a link 179. Operating in this mode, the CRS 110, or multiple CRSs, may act as a spatially diverse MCS throttle. That is, a finer spatial granularity of MCS adjustment may be possible than if the CRS were not available for MCS translation.

One or more of these various modes of cooperation may result in the reception at the receiver 178 of various versions of a packet that is space-time coded or turbo-coded across the source station 128 and one or more CRSs. The cooperative mechanisms described herein may provide extra diversity and coding gains to enable the destination station 138 to eventually decode the originally-transmitted SD packet 154.

In a further embodiment, a system 180 may include one or more of the apparatus 100. An antenna 186 may be operatively coupled to the CRS receiver 122 to receive the SD packet 154. The antenna 186 may comprise a patch antenna, an omnidirectional antenna, a beam antenna, a monopole antenna, a dipole antenna, or slot antenna, among other types.

Any of the components previously described may be implemented in a number of ways, including embodiments in software. Thus, the apparatus 100; the CRS 110; the WPCN 114; the link quality estimators 118, 130; the receivers 122, 178; the links 124, 134, 146, 179; the transmitters 126, 136, 166; the stations 128, 138; the SD link quality logic 142; the cooperator decision logic 150; the SD packet 154; the CRS resource estimator 158; the packet repeater logic 162; the decoder 170; the variable-rate encoder 174; the system 180; and the antenna 186 may all be characterized as "modules" herein.

The modules may include hardware circuitry, single or multi-processor circuits, memory circuits, software program modules and objects, firmware, and combinations thereof, as desired by the architect of the apparatus 100 and the system 180 and as appropriate for particular implementations of various embodiments.

The apparatus and systems described herein may be useful in applications other than enabling a cooperative transmission mechanism in a WPCN based upon signal quality factors derived from RTS and CTS packets received at a CRS. Thus, various embodiments of the invention are not to be so limited. The illustrations of the apparatus 100 and the system 180 are intended to provide a general understanding of the structure of various embodiments. They are not intended to serve as a complete description of all the elements and features of apparatus and systems that might make use of the structures described herein.

The novel apparatus and systems herein may be included in electronic circuitry used in high-speed computers, communication and signal processing circuitry, modems, single or multi-processor modules, single or multiple embedded processors, multi-core processors, data switches, and application-specific modules, including multilayer, multi-chip modules. Such apparatus and systems may further be included as sub-components within a variety of electronic systems, such as televisions, cellular telephones, personal computers (e.g., laptop computers, desktop computers, handheld computers, tablet computers, etc.), workstations, radios, video players, audio players (e.g., MP3 (Motion Picture Experts Group, Audio Layer 3) players), vehicles, medical devices (e.g., heart monitor, blood pressure monitor, etc.), set top boxes, and others. Some embodiments may include a number of methods.

Figure 2:
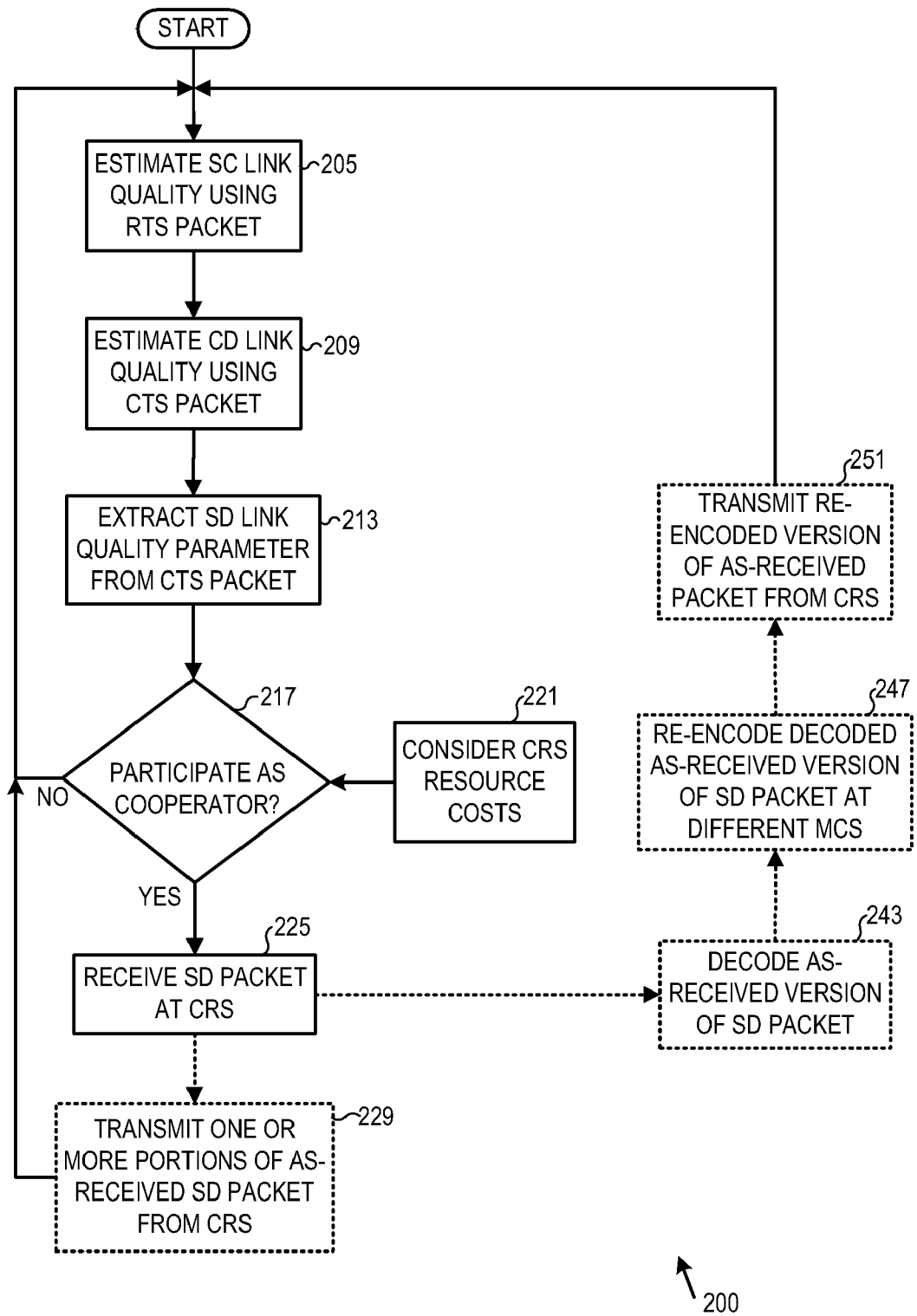
FIG. 2 is a flow diagram illustrating several methods according to various embodiments.

FIG. 2 is a flow diagram illustrating several methods according to various embodiments. A method 200 may be performed at a CRS in a WPCN. The WPCN may operate according to an IEEE 802.11 standard or an IEEE 802.16 standard, but is not limited to these standards.

The method 200 may commence at block 205 with estimating a link quality of an SC wireless channel ("SC link quality"). The SC link quality may be estimated using signal quality information derived from a packet transmitted by a source station and received by the CRS. In some embodiments, the packet transmitted by the source station may comprise an RTS packet. That is, the CRS may calculate or estimate the quality of the SC link from received signal characteristics measured while receiving the RTS packet.

The method 200 may continue with estimating a link quality of a CD wireless channel ("CD link quality"), at block 209. The CD link quality may be estimated using signal quality information derived from a packet transmitted by a destination station and received by the CRS. In some embodiments, the packet transmitted by the destination station may comprise a CTS packet. That is, the CRS may calculate or estimate the quality of the CD link from received signal characteristics measured while receiving the CTS packet.

"Signal quality information" as used herein may comprise a received signal strength indication, a signal-to-noise ratio, and a channel capacity/throughput, among other measures of signal quality. These measurements may also account for link errors, finite MCSs, and latency/energy constraints. The signal quality information derived from the RTS packet or from the CTS packet may be measured using the packet preamble or the packet date field, among other portions of the packet.

In some wireless systems, the destination station may measure signal characteristics associated with one or more packets received from the source station on a wireless link. The destination station may calculate or estimate the quality of the wireless link ("SD link quality") from the measured signal characteristics. The destination station may subsequently embed a value corresponding to the SD link quality in a link quality parameter in the CTS packet. Upon receipt of the CTS packet at the CRS, link quality logic (e.g., the SD link quality logic 142 of FIG. 1) may extract the link quality parameter from the CTS packet. The method 200 may thus include extracting an SD link quality parameter comprising an indication of an SD link quality from the CTS packet, at block 213.

The method 200 may also include deciding whether to participate with the source station or another CRS in transmitting an SD packet, at block 217. The decision to participate or not may be based upon the SC link quality, the CD link quality, or the SD link quality. In an example embodiment, the CRS may participate with the source station or with another CRS if the SC link quality, the CD link quality, or both are higher than the SD link quality. Many other decision criteria are possible. For example, the method 200 may also include considering resource costs associated with the CRS as factors in the decision to participate or not, at block 221. Such CRS-based cost considerations may include remaining battery life and a cost of airtime, among other factors.

If the CRS decides to participate in transmitting the SD packet, the method 200 may continue with receiving the SD packet at the CRS, at block 225. The method 200 may also include transmitting an as-received version of the SD packet or a portion thereof from the CRS, at block 229. Various cooperative transmission schemes may be possible. For example, in some embodiments the CRS may act as a multi-hop relay. That is, the as-received version of the SD packet or a portion thereof may be transmitted from the CRS in lieu of a retransmission of the SD packet by the source station.

In some embodiments the source station and the CRS may both transmit the SD packet. In another example, a first portion of the as-received version of the SD packet may be transmitted from the CRS on a different channel than a channel used by the source station to re-transmit a second portion of the SD packet. The first and second portions of the SD packet may identical or different. A channel in this context may comprise a timeslot in a time-division multiplexed system, a frequency or a group of frequencies in a frequency-division multiplexed system, or a combination thereof.

The method 200 may also include cooperative transmission schemes that decode and re-encode packets at the CRS for transmission from the CRS at an MCS different from the MCS used to transmit the packets from the source station. In some embodiments, for example, packets may be transmitted from the source station and received at the CRS at a highest system-supported MCS. The CRS may perform rate adaptation by re-transmitting the packets at a different MCS. The method 200 may thus include decoding the as-received version of the SD packet at the CRS, at block 243. The method 200 may also include re-encoding the decoded as-received version of the SD packet using an MCS different from an MCS of the as-received version of the SD packet, at block 247. The method 200 may further include transmitting the re-encoded version of the as-received SD packet from the CRS, at block 251.

It may be possible to execute the activities described herein in an order other than the order described. Various activities described with respect to the methods identified herein may be executed in repetitive, serial, or parallel fashion, or a combination thereof.

A software program may be launched from a computer-readable medium (CRM) in a computer-based system to execute functions defined in the software program. Various programming languages may be employed to create software programs designed to implement and perform the methods disclosed herein. The programs may be structured in an object-oriented format using an object-oriented language such as Java or C++. Alternatively, the programs may be structured in a procedure-oriented format using a procedural language, such as assembly or C. The software components may communicate using a number of mechanisms well known to those skilled in the art, such as application program interfaces or inter-process communication techniques, including remote procedure calls. The teachings of various embodiments are not limited to any particular programming language or environment. Thus, other embodiments may be realized, as discussed regarding FIG. 3 below.

Figure 3:
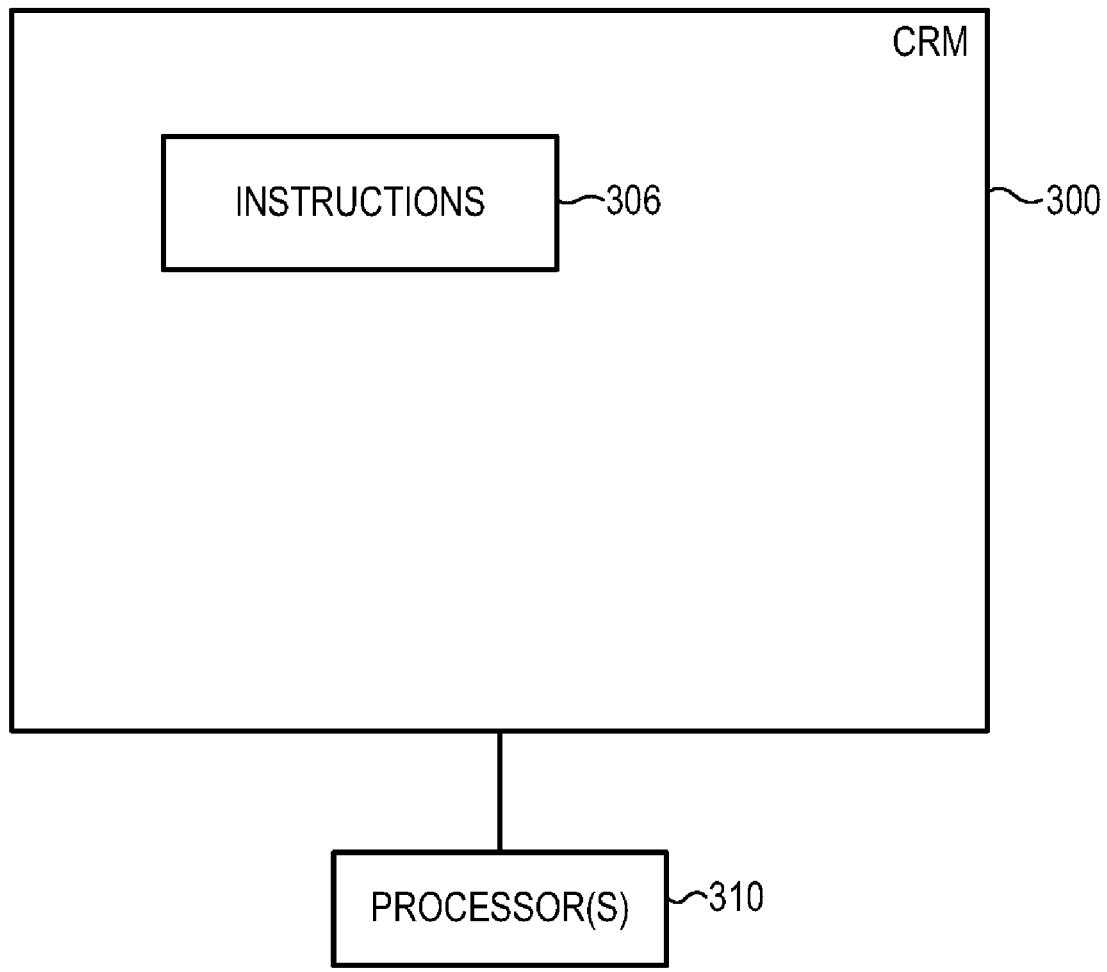
FIG. 3 is a block diagram of a computer-readable medium according to various embodiments.

FIG. 3 is a block diagram of a computer-readable medium (CRM) 300 according to various embodiments of the invention. Examples of such embodiments may comprise a memory system, a magnetic or optical disk, or some other storage device. The CRM 300 may contain instructions 306 which, when accessed, result in one or more processors 310 performing any of the activities previously described, including those discussed with respect to the method 200 noted above.

Apparatus, systems, and methods herein may enable a dynamic, robust, distributed cooperative transmission mechanism in a WPCN. Self-selection of a CRS may be based upon signal quality factors derived from packets received at the CRS, including RTS and CTS packets in some embodiments. Implementation may be possible without requiring centralized coordination or routing tables.

Although the inventive concept may include embodiments described in the exemplary context of an Institute of Electrical and Electronic Engineers (IEEE) standard 802.xx implementation (e.g., 802.11, 802.11a, 802.11b, 802.11e, 802.11g, 802.16, 802.16e™, etc.), the claims are not so limited. Additional information regarding the IEEE 802.11a protocol standard may be found in IEEE Std 802.11a, Supplement to IEEE Standard for Information technology—Telecommunications and information exchange between systems—Local and metropolitan area networks—Specific requirements Part 11: Wireless LAN Medium Access Control (MAC) and Physical Layer (PHY) specifications—High-speed Physical Layer in the 5 GHz Band (published 1999; reaffirmed Jun. 12, 2003). Additional information regarding the IEEE 802.11b protocol standard may be found in IEEE Std 802.11b, Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band (approved Sep. 16, 1999; reaffirmed Jun. 12, 2003). Additional information regarding the IEEE 802.11e standard may be found in "IEEE 802.11e Standard for Information technology—Telecommunications and information exchange between systems—Local and metropolitan area networks—Specific requirements Part 11: Wireless LAN Medium Access Control (MAC) and Physical Layer (PHY) specifications: Amendment 8: Medium Access Control (MAC) Quality of Service Enhancements (published 2005). Additional information regarding the IEEE 802.11g protocol standard may be found in IEEE Std 802.11g™, IEEE Std 802.11g™, IEEE Standard for Information technology—Telecommunications and information exchange between systems—Local and metropolitan area networks—Specific requirements Part 11: Wireless LAN Medium Access Control (MAC) and Physical Layer (PHY) specifications Amendment 4: Further Higher Data Rate Extension in the 2.4 GHz Band (approved Jun. 12, 2003). Additional information regarding the IEEE 802.16 protocol standard may be found in IEEE Standard for Local and Metropolitan Area Networks—Part 16: Air Interface for Fixed Broadband Wireless Access Systems (published Oct. 1, 2004).

Embodiments of the present invention may be implemented as part of a wired or wireless system. Examples may also include embodiments comprising multi-carrier wireless communication channels (e.g., orthogonal frequency division multiplexing (OFDM), discrete multitone (DMT), etc.) such as may be used within a wireless personal area network (WPAN), a wireless local area network (WLAN), a wireless metropolitan area network (WMAN), a wireless wide area network (WWAN), a cellular network, a third generation (3G) network, a fourth generation (4G) network, a universal mobile telephone system (UMTS), and like communication systems, without limitation.

The accompanying drawings that form a part hereof show, by way of illustration and not of limitation, specific embodiments in which the subject matter may be practiced. The embodiments illustrated are described in sufficient detail to enable those skilled in the art to practice the teachings disclosed herein. Other embodiments may be utilized and derived therefrom; therefore structural and logical substitutions and changes may be made without departing from the scope of this disclosure. This Detailed Description is therefore not to be taken in a limiting sense, and the scope of various embodiments is defined only by the appended claims along with the full range of equivalents to which such claims are entitled.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the embodiments describe above and other embodiments not specifically described herein will be apparent to those of skill in the art upon reviewing the above description.

The Abstract of the Disclosure is provided to comply with 37 C.F.R. §1.72(b) requiring an abstract that will allow the reader to quickly ascertain the nature of the technical disclosure. It is submitted with the understanding that it will not be used to interpret or limit the scope or meaning of the claims. Various features may be grouped together in the foregoing Detailed Description in a single embodiment for the purpose of streamlining the disclosure. This method of disclosure is not to be interpreted to require more features than are expressly recited in each claim. Rather, inventive subject matter may be found in less than all features of a single disclosed embodiment. Thus the following claims are hereby incorporated into the Detailed Description, with each claim standing on its own as a separate embodiment.

What is claimed is:

1. An apparatus including a combination of hardware and software associated with a cooperating relay station (CRS) in a wireless packet-carrying network (WPCN), including:
   a source-to-CRS (SC) link quality estimator coupled to a CRS receiver to estimate an SC link quality of an SC wireless channel using signal quality information derived from a first packet transmitted by a source station and received by the CRS;
   a CRS-to-destination (CD) link quality estimator coupled to the CRS receiver to estimate a CD link quality of a CD wireless channel using signal quality information derived from a second packet transmitted by a destination station and received by the CRS;
   source-to-destination (SD) link quality logic coupled to the CRS receiver to extract a value of an SD link quality parameter from the second packet; and
   cooperator decision logic coupled to at least one of the SC link quality estimator, the CD link quality estimator, or the SD link quality logic to choose whether to participate with at least one of the source station or another CRS in transmitting an SD packet based upon at least one of the SC link quality, the CD link quality, or the value of the SD link quality parameter;
   wherein the first packet comprises a request-to-send (RTS) packet; and
   wherein the second packet comprises a clear-to-send (CTS) packet.

2. The apparatus of claim 1, wherein the value of the SD link quality parameter comprises an indication of an SD link quality measured at the destination station from signal characteristics associated with at least one packet received from the source station.

3. The apparatus of claim 1, further including:
   a CRS resource estimator coupled to the cooperator decision logic to provide an estimate of at least one of a remaining battery life or a cost of airtime associated with the CRS.

4. The apparatus of claim 1, further including:
   packet repeater logic operatively coupled to the CRS receiver and to a CRS transmitter to transmit at least a portion of an as-received version of the SD packet from the CRS.

5. The apparatus of claim 1, further including:
   a decoder coupled to the CRS receiver to decode an as-received version of the SD packet at the CRS.

6. The apparatus of claim 5, further including:
   a variable-rate encoder coupled to the decoder to re-encode the decoded as-received version of the SD packet using a modulation and coding scheme (MCS) different from an MCS of the as-received version of the SD packet.

7. A system including a combination of hardware and software, including:
   a source-to-CRS (SC) link quality estimator coupled to a CRS receiver to estimate an SC link quality of an SC wireless channel using signal quality information derived from a first packet transmitted by a source station and received by the CRS;
   a CRS-to-destination (CD) link quality estimator coupled to the CRS receiver to estimate a CD link quality of a CD wireless channel using signal quality information derived from a second packet transmitted by a destination station and received by the CRS;
   source-to-destination (SD) link quality logic coupled to the CRS receiver to extract a value of an SD link quality parameter from the second packet; and
   cooperator decision logic coupled to at least one of the SC link quality estimator, the CD link quality estimator, or the SD link quality logic to decide whether to participate with at least one of the source station or another CRS in transmitting an SD packet based upon at least one of the SC link quality, the CD link quality, or the value of the SD link quality parameter; and
   an omnidirectional antenna operatively coupled to the CRS receiver to receive the SD packet;
   wherein the first packet comprises a request-to-send (RIS) packet; and wherein the second packet comprises a clear-to-send (CIS) packet.

8. The system of claim 7, further including:
   packet repeater logic operatively coupled to the CRS receiver and to a CRS transmitter to transmit at least a portion of an as-received version of the SD packet from the CRS.

9. The system of claim 7, wherein the WPCN is configured according to at least one of an Institute of Electrical and Electronic Engineers (IEEE) 802.11 standard and an IEEE 802.16 standard.

10. A method performed at a cooperating relay station (CRS) in a wireless packet-carrying network (WPCN), including:
- estimating a source-to-CRS (SC) link quality of an SC wireless channel using signal quality information derived from a first packet transmitted by a source station and received by the CRS;
- estimating a CRS-to-destination (CD) link quality of a CD wireless channel using signal quality information derived from a second packet transmitted by a destination station and received by the CRS;
- extracting a value of source-to-destination (SD) link quality parameter from the second packet; and
- deciding whether to participate with at least one of the source station or another CRS in transmitting an SD packet based upon at least one of the SC link quality, the CD link quality, or the value of the SD link quality parameter;
- wherein the first packet comprises a request-to-send (RIS) packet; and
- wherein the second packet comprises a clear-to-send (CIS) packet.

11. The method of claim 10, wherein the value of the SD link quality parameter comprises an indication of an SD link quality measured at the destination station from signal characteristics associated with at least one packet received from the source station.

12. The method of claim 11, further including:
- deciding to participate with at least one of the source station or another CRS in transmitting an SD packet if at least one of the SC link quality or the CD link quality is higher than the SD link quality.

13. The method of claim 10, further including:
- considering at least one of a remaining battery life or a cost of airtime associated with the CRS in deciding whether to participate with the at least one of the source station or another CRS in transmitting the SD packet.

14. The method of claim 10, further including:
- receiving the SD packet at the CRS; and
- transmitting at least a portion of an as-received version of the SD packet from the CRS.

15. The method of claim 10, further including:
- receiving the SD packet at the CRS; and
- transmitting at least a portion of an as-received version of the SD packet from the CRS in lieu of a retransmission of the SD packet by the source station.

16. The method of claim 10, further including:
- receiving the SD packet at the CRS; and
- transmitting at least one first portion of an as-received version of the SD packet from the CRS on a different channel than a channel used by the source station to re-transmit at least one second portion of the SD packet.

17. The method of claim 16, wherein the at least one first portion of the SD packet is identical to the at least one second portion of the SD packet.

18. The method of claim 16, wherein at least one of the channel or the different channel comprises at least one of a timeslot associated with a time-division multiplexed system or at least one frequency associated with a frequency-division multiplexed system.

19. The method of claim 10, further including:
- receiving the SD packet at the CRS;
- decoding an as-received version of the SD packet at the CRS;
- re-encoding the decoded as-received version of the SD packet using a modulation and coding scheme (MCS) different from an MCS of the as-received version of the SD packet; and
- transmitting the re-encoded version of the as-received SD packet from the CRS.

20. The method of claim 19, wherein the SD packet is received from the source station at a highest system-supported MCS.

21. The method of claim 10, wherein at least one of the signal quality information derived from the first packet or the signal quality information derived from the second packet comprises at least one of a received signal strength indication, a signal-to-noise ratio, a signal-to-interference plus noise ratio, or a channel capacity.

22. The method of claim 10, further including:
- measuring at least one of the signal quality information derived from the first packet or the signal quality information derived from the second packet using at least one of a packet preamble or a packet data field.

23. A non-transitory computer-readable medium having instructions, wherein the instructions, when executed, result in at least one processor performing the following at a cooperating relay station (CRS) in a wireless packet-carrying network (WPCN):
- estimating a source-to-CRS (SC) link quality of an SC wireless channel using signal quality information derived from a first packet transmitted by a source station and received by the CRS;
- estimating a CRS-to-destination (CD) link quality of a CD wireless channel using signal quality information derived from a second packet transmitted by a destination station and received by the CRS;
- extracting a source-to-destination (SD) link quality parameter from the second packet, wherein a value of the SD link quality parameter comprises an indication of an SD link quality measured at the destination station from signal characteristics associated with at least one packet received from the source station; and
- deciding whether to participate with at least one of the source station or another CRS in transmitting an SD packet based upon at least one of the SC link quality, the CD link quality, or the value of the SD link quality parameter:
- wherein the first packet comprises a request-to-send (RIS) packet; and
- wherein the second packet comprises a clear-to-send (CIS) packet.

24. The computer-readable medium of claim 23, wherein the WPCN operates according to at least one of an Institute of Electrical and Electronic Engineers (IEEE) 802.11 standard or an IEEE 802.16 standard.

25. The computer-readable medium of claim 23, wherein the instructions, when executed, result in the at least one processor performing:
- receiving the SD packet at the CRS; and
- transmitting at least a portion of an as-received version of the SD packet from the CRS.

* * * * *

UNITED STATES PATENT AND TRADEMARK OFFICE
CERTIFICATE OF CORRECTION

PATENT NO. : 7,760,678 B2  Page 1 of 1
APPLICATION NO. : 11/563386
DATED : July 20, 2010
INVENTOR(S) : Sumeet Sandhu et al.

It is certified that error appears in the above-identified patent and that said Letters Patent is hereby corrected as shown below:

In column 8, line 56, in Claim 7, delete "(RIS)" and insert -- (RTS) --, therefor.

In column 8, line 58, in Claim 7, delete "(CIS)" and insert -- (CTS) --, therefor.

In column 9, line 19, in Claim 10, delete "(RIS)" and insert -- (RTS) --, therefor.

In column 9, line 21, in Claim 10, delete "(CIS)" and insert -- (CTS) --, therefor.

In column 10, line 46, in Claim 23, delete "parameter:" and insert -- parameter; --, therefor.

In column 10, line 47, in Claim 23, delete "(RIS)" and insert -- (RTS) --, therefor.

In column 10, line 49, in Claim 23, delete "(CIS)" and insert -- (CTS) --, therefor.

Signed and Sealed this

Fourteenth Day of September, 2010

David J. Kappos
*Director of the United States Patent and Trademark Office*